(12) United States Patent
Rao

(10) Patent No.: US 6,284,155 B1
(45) Date of Patent: Sep. 4, 2001

(54) METHOD FOR MAKING SMALL PARTICLE RED EMITTING PHOSPHORS

(75) Inventor: Ravilisetty P. Rao, Highland, NY (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/425,872

(22) Filed: Oct. 23, 1999

(51) Int. Cl.$^7$ ............... C09K 11/63; C09K 11/77
(52) U.S. Cl. ........................................ 252/301.4 R
(58) Field of Search ............................. 252/301.4 R

(56) References Cited

U.S. PATENT DOCUMENTS

| | | | |
|---|---|---|---|
| 4,202,794 | 5/1980 | Lehmann | 252/301.4 R |
| 5,776,368 | 7/1998 | Chau | 252/301.4 R |
| 6,042,747 | * 3/2000 | Rao | 252/301.4 R |

FOREIGN PATENT DOCUMENTS

| | | |
|---|---|---|
| 59-15951 | 4/1984 | (JP) . |
| WO97/26312 | 7/1997 | (WO) . |

* cited by examiner

*Primary Examiner*—C. Melissa Koslow
(74) *Attorney, Agent, or Firm*—Ohlandt, Greeley, Ruggiero & Perle, L.L.P.

(57) ABSTRACT

Yttrium, gadolinium borate phosphor particles are produced by thermal decomposition of a xerogel or an aerogel including Rare Earth (yttrium, gadolinium and europium) and Alkaline Earth (barium, strontium, calcium, magnesium) salts. A sol-gel method is used and an organic precursor such as trimethyl borate obtains the respective xerogel or aerogel. Thermal decomposition of the gel takes place at a temperature well below the normal temperature of solid state reaction synthesis. The brightness of the final phosphor is improved by 5 to 10 by mixing the gel powder with respective nitrates thereof prior to calcination. The phosphor has the empirical formula: $(Y_{1-x-y-z} Eu_x Gd_y M_z)BO_3$ wherein: $0.01 \leq x \leq 0.1$, $0 \leq y \leq 0.5$, M=Ba/Sr/Ca/Mg and $z \leq 0.1$.

16 Claims, 5 Drawing Sheets

METHOD FOR MAKING SMALL PARTICLE RED EMITTING PHOSPHORS

FIELD OF THE INVENTION

This invention relates to synthesis of rare earth (yttrium, gadolinium), alkaline earth (barium, strontium, calcium, and magnesium) borate phosphor particles activated with europium. More specifically, this invention relates to an improved method of formation of such particles from respective nitrates and organic precursors, which form small particles that improve the brightness as required for flat panel display (FPD) and lamp applications.

BACKGROUND OF THE INVENTION

Europium activated yttrium, gadolinium $(Y,Gd)BO_3:Eu^{3+}$ is an efficient red emitting phosphor. Efforts have been made to improve the performance of this phosphor currently used in Plasma Display Panels (PDP) due to its high quantum efficiency, persistence characteristics and reduced saturation.

$Eu^{3+}$ activated rare earth and alkaline earth borate phosphor is one phosphor candidate that has been investigated by Applicant herein, as described in copending U.S. patent application, Ser. No. 09/12,169, now U.S. Pat. No. 6,042,347, the disclosure of which is incorporated herein by reference. The aforesaid phosphor exhibits three narrow peaks in the red region.

These phosphors are typically prepared by a high temperature (>1200° C.) solid state reaction (SSR) between $Y_2O_3$ (Y source), $Gd_2O_3$ (Gd source), $Eu_2O_3$ (Eu source), boric acid and a flux ($NH_4F$ or $NH_4Cl$). The grain size of the phosphor powders prepared from SSR is of the order 5 to 10 microns. Flat panel display devices, such as PDP's, Field Emission Displays (FED) and Electro-Luminescence (EL) panels require thin fluorescent screens with fine grain (0.1 to 2.0 microns) phosphors for optimum performance and high efficiency. This requirement is more demanding in the case of PDP's, as the phosphors are screen-printed between the ribs to form a complicated structure. With small particles, it is possible to form a thin screen. Small particles also allow for a higher packing density and require less binder content to form an adherent thick film to its substrate.

Traditionally, small phosphor particles have been obtained by grinding, crushing or milling of larger phosphors into small particles. Phosphors obtained by these methods show greatly reduced efficiency with little or no control over the particle morphology. More recently, "no mill" phosphors have been prepared by rapid cooling of the mass after completing the SSR, and with either a short-time firing at a higher temperature, or a longer duration firing at a lower temperature. These processes help minimize further growth of phosphor crystals. In the presence of flux or inhibitors, particle size distribution (PSD) and morphology of the phosphor can be controlled. It has been proposed that sub-micron size phosphor particles can be synthesized by sol-gel methods.

Most prior art red phosphors are $Eu^{3+}$ activated yttrium oxide for fluorescent lamps and yttrium oxy-sulfide for CRT's. Since these phosphors are not suitable for AC type PDP's, efforts are being made to develop new phosphors, which are excitable with 147 and 173 nm from a Xenon source in a PDP. Willi Lehmann (U.S. Pat. No. 4,202,794) proposed an improved phosphor composition expressed by the general formulation $xCaO.y(Y+Eu)_2.zB_2O_3$ wherein x is from 32 to 38, y is from 31 to 40 and z is from 25 to 31, with x, y, and z expressing relative molar proportions of the constituents. The Lehman phosphor composition has a higher photoluminescence efficiency than similar type phosphors, and when excited by 254 nm radiation emits in the red region of the visible spectrum.

Chung-Nin Chau in U.S. Pat. No. 5,776,368 teaches an improved method for a single firing synthesis of a borate phosphor having a general formula $(Y_{1-x-y}Gd_xEu_y) BO_3$, where x is from about 0.1 to about 0.3 and y is from about 0.05 to about 0.12. In addition to boric acid, boron nitride was used as a source of boron. The calcination was carried out at a solid state reaction temperature (1250° C. for 3 hours).

Japanese patent 59-15951 to Tsujimoto et al. describes a rare earth borate based phosphor composition $LnBO_3:Eu,Bi$ (where Ln is Y or Gd) for plasma display applications These phosphors are synthesized by firing respective oxides at 1250° C. for 3 hours. Huguenin et al. (WO 97/26312) describe a method of making $Eu^{3+}$ activated (Y,Gd) $BO_3$ phosphors by calcinating rare earth carbonates as well as rare earth hydroxycarbonates with boric acid at 1100° C. for 10 hours.

Solid state reactions, involve high temperature calcination (>1100° C.). With this high temperature process, the control over impurity concentration, distribution of activators in the bulk, single phase formation, PSD and morphology are limited. It has been found that the phosphor screens formed with small particles (0.5 to 2.0 microns) exhibit improved performance. This is particularly true for PDP's. The growth of small particles through use of sol-gel methods, where the reaction temperatures are well below the normal solid state temperatures (<1000° C.).

SUMMARY OF THE INVENTION

Co-pending application, Ser. No. 09/012,169, filed on Jan. 22, 1998, presents a method of making a trivalent europium activated rare earth and alkaline earth borate phosphor. It has been discovered that by mixing a rare earth (RE) xerogel or aerogel powder with respective nitrates prior to calcination, that the brightness of the final phosphor improves by 5 to 10%. Accordingly, the present invention to provides a $Eu^{3+}$ activated yttrium, gadolinium borate phosphor having the empirical formula:

$(Y_{1-x-y-z}Eu_xGd_yM_z) BO_3$ wherein: $0.01 \leq x \leq 0.1$, $0 \leq y \leq 0.5$, M=Ba, Sr, Ca, Mg and $z \leq 0.1$, which method provides the phosphor in the form of a powder having a small particle size which evidences improved brightness.

DETAILED DESCRIPTION OF THE INVENTION

Figure 1:
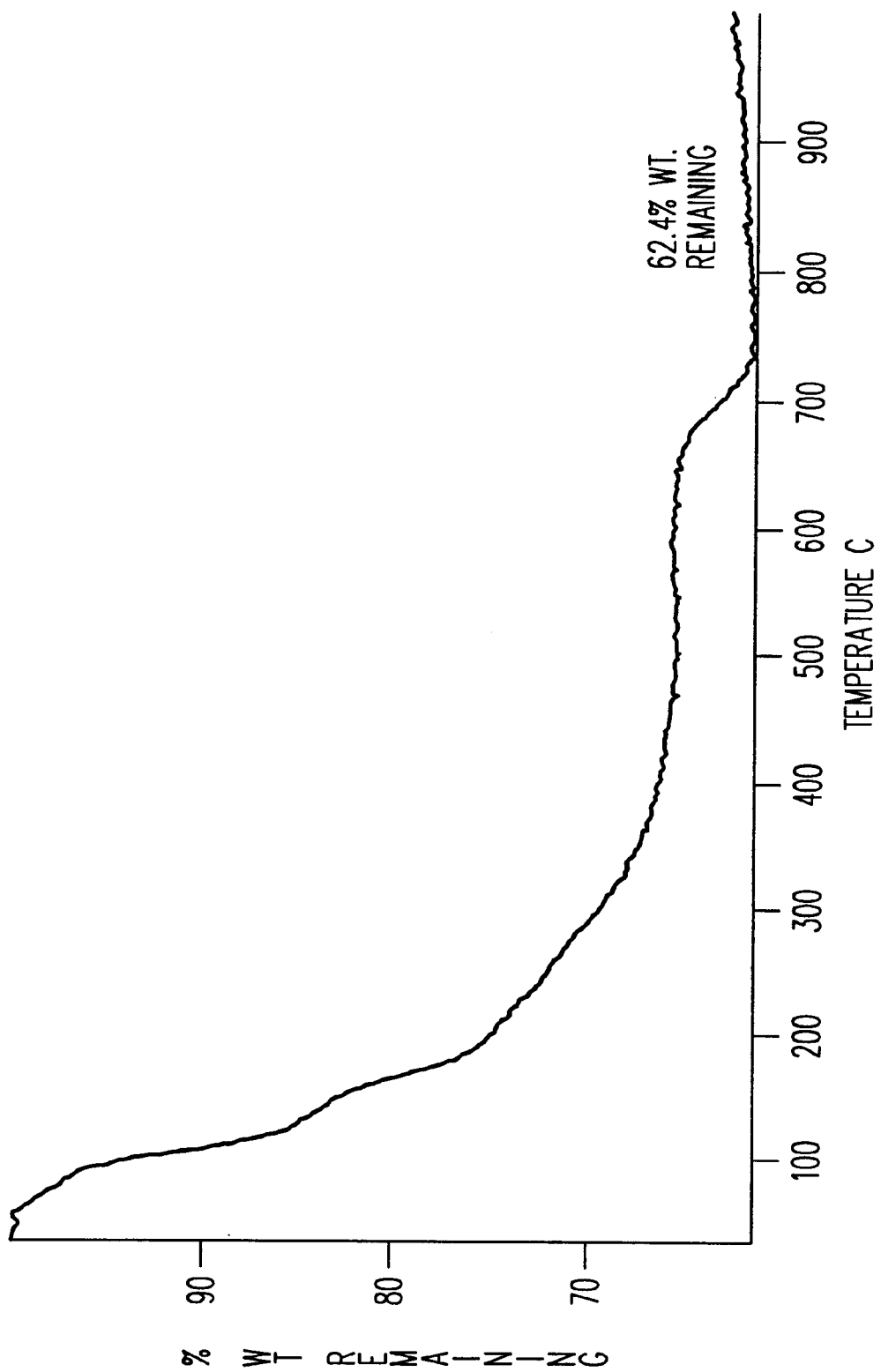
FIG. 1 provides a thermo-gravimetric analysis (TGA) of RE borate xerogel powder.

The phosphors disclosed below are synthesized by calcinating xerogel or aerogel powders obtained from a sol-gel method. A sol-gel method offers many advantages over conventional methods in the synthesis of fine powders and particularly phosphor materials. Since all of the starting materials are mixed at the molecular level in a solution, a high degree of homogeneity is achievable. Doping of impurities (activators/coactivators/sensitizers) through solutions is straightforward and effective. In a multi component system, the homogeneity can be maintained on an atomic scale. The surface area of powders produced from the sol-gel process is very high, leading to lower processing (calcination) temperatures.

Phosphor materials are extremely sensitive to impurities; even in ppb levels, the low-temperature process through the sol-gel method minimizes the potential for cross contamination. Some of the unwanted impurities left in the materials from conventional methods may pose a threat to the performance of a phosphor. As the size of the phosphor particle decreases, the probability of electron and hole capture to the impurity increases and the electron-hole (e-h) localization enhances the recombination rate via the impurity. The optimum impurity concentration (activator) level can be further increased with small particle size.

In the present invention, the preparation of a $Eu^{3+}$ activated yttrium, gadolinium and alkaline earth borate phosphor from a xerogel and aerogel obtained from sol-gel method and required quantities of yttrium nitrate, gadolinium nitrate and europium nitrate and one of the alkaline earth nitrates. In general, excess borate is employed as a flux to reduce the solid state reaction temperature and to improve the crystallinity and shape of the phosphor particles. By adding rare earth nitrates in the form of powders to the aerogel or xerogel powders before calcination, the excess borate is used in synthesizing more phosphor at a lower calcination temperature. The morphology of the phosphor particles prepared in the presence of nitrates is the same as a phosphor prepared without the nitrates. Firing of the xerogel or aerogel powders with rare earth nitrates results in phosphors that exhibit higher brightness. It is also found that the phosphor particles are free from boric acid and are well crystallized. The smaller size phosphor particles formed using the method of the present invention make them particularly suitable for use when a high packing density is required.

More specifically, the present invention provides a method for forming an $Eu^{3+}$ activated yttrium, gadolinium, alkaline earth borate phosphor having the empirical formula:

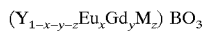

$(Y_{1-x-y-z}Eu_xGd_yM_z) BO_3$ wherein: $0.01 \leq x \leq 0.1$, $0 \leq y \leq 0.5$, M=Ba, Sr, Ca, Mg and $z \leq 0.1$.

The method includes the steps of:
1) reacting a dilute solution comprising a source of yttrium, a source of gadolinium, a source of europium, a source of an alkaline earth element and an organic precursor providing a source of boron, in an acid medium to form a sol gel;
2) converting the sol-gel into a xerogel (normal drying) or converting sol-gel into an aerogel (vacuum drying);
3) adding a quantity of nitrates of the rare earth elements and the alkaline earth element reacted in step (1); the quantities of each nitrate and its respective rare earth element and alkaline earth element being adjusted so that the combined element and its nitrate exhibit a mole percent in accord with the above-indicated empirical formula; and
4) thermally decomposing the xerogel or aerogel powders along with the respective nitrates at a temperature below a solid state reaction temperature.

Converting the dilute gel into a xerogel or an aerogel causes the gel to be dried. The dried xerogel or aerogel is thereafter crushed to form a powder prior to thermally decomposing the xerogel or aerogel.

The present invention provides a method of synthesizing yttrium, gadolinium borate phosphors incorporating high concentrations of activator ion ($Eu^{3+}$). The formation of yttrium, gadolinium solid solution is critical and is mainly dependent on the reaction temperature profile. In a solid state reaction, respective salts such as oxides, carbonates, etc., are reacted at higher temperatures in the presence of excess boric acid or boron nitrite. At these temperatures there is every possibility of formation of other phases such as individual borate complexes and unreacted oxides of yttrium, gadolinium, etc. Proper doping of impurity ions into lattice of the complex is uncertain. Further, a high temperature process will lead to growth of larger particles.

Metal precursors are synthesized by adopting the following three routes:

1. The alkoxide was synthesized by adding metal (for example, yttrium) acetate $(YOOCH_3)_3 \cdot xH_2O$ to 2-methoxyethanol $(OCH_3C_2H_5OH)$. After refluxing at 125° C. for 12 hours, the clear solution turned to a slight greenish-yellow solution. These yttrium methoxyethoxide sols were stable for months at room temperature. Yttrium isopropoxide was also prepared by mixing lithium isopropoxide in isopropyl alcohol with yttrium chloride in tetrahydrofuran. This solution required later filtration and purification to remove chloride and lithium ions from the product.

2. The yttrium hydroxide precursor was prepared by precipitating an aqueous solution of $YCl_3$ or $Y(NO_3)_3$ (0.01M) in water by the addition of a base, such as ammonium hydroxide, to the solution. A gelatinous precipitate with pH=10.0 to 10.4 was obtained. The gels were washed a number of times with DI water to remove counter ions ($NO_3^-$ or $NH_4^+$). Trace amounts of these ions have previously been found to cause efficiency deterioration of the final product. Due to various difficulties in controlling the process and expensive chemicals, neither of these methods may be economically feasible for preparation of bulk quantities of the above mentioned phosphors.

3. By using an ion exchange resin, stable sol-gels were prepared. Yttrium nitrates of 99.99% purity were dissolved in de-ionized (DI) water to obtain a clear 0.01M solution. The solution was then passed through an ion $(OH)^-$ exchange column with Dowex 1X4 (50–100 mesh) resin at room temperature. The flow of the solution was controlled to maintain the pH of the collected solution at 11.0. Since the resultant solution contained only a small quantity of yttrium, attempts were made to increase the concentration of nitrates up to 0.1M. Yttrium hydroxide sol collected at the bottom of the resin column was clear but with the increase of yttrium concentration, as well as with storage time, became opalescent. Sols prepared at lower concentrations of yttrium were stable for months. Similarly, the sols of other metal (Eu, Gd, and AE) hydroxides were prepared.

Required metal solutions were also prepared by mixing appropriate amounts of respective metal nitrates in a lukewarm DI water to obtain 0.05 to 0.1 M solutions. Stiochemtric quantities of metal (Y,Gd,Eu,AE) solutions and trimethyl borate were added together. The metal/borate solution was transferred to a round bottom flask and gelation were carried out by peptizing at 80 to 100° C. for 12 to 18 hours in a stirrer mantle.

Gelation was preferably carried out with acid catalyzed sols (pH=1.0 to 2.0). In low pH sols, pepitization requires a critical amount of certain acids to be introduced into the solution. Acid additions are generally specified in terms of acid type and pH. It has been reported that the type of acid is more important than pH. Nitric acid, hydrochloric acid and boric acid have been found to be particularly useful as peptizing agents that lead to the formation of structurally homogeneous gel networks. The use of boric acid has been found particularly preferable as it acts as an acid catalyzer as well as a boron source. The loss of boron during the calcination is compensated by excess boric acid.

After pepitization, the sol/gel is left in a container (crystalizing dish) until it becomes a thick gel (3 to 5 days). The so-called gel is than dried in a lab oven at 50° C. to 60° C. until it becomes a xerogel (powder). Aerogels are also prepared from the same gels by extracting the water and other solvents in vacuum through a cold trap. The xerogel or aerogel is mixed with required amounts of yttrium nitrate, gadolinium nitrate, alkaline earth nitrate and europium nitrate. An aerogel or xerogel or complex of any one of these gel powders with nitrates is transferred into a high-grade alumina crucible and subjected to two heat cycles. In the first heat cycle, the sample is soaked for 2 hours at 350° C. and then heated to 900 to 1000° C. for 2 to 12 hours. After cooling to room temperature, a small quantity of water pulps the hard mass into fine particles. These fine phosphor powders are then subjected to an ultrasonic or a water-jet treatment to help to break the clusters into very small particles without destroying the morphology of the particles.

Thermal analysis of several samples with various metal proportions were studied to understand reaction kinetics. Thermal anlaysis data for one of these samples is presented in FIG. 1. The data reveals that the samples have undergone two to three successive weight changes into three different temperature regions. The first one, occurring around 100° C., corresponds to loss of free water molecules associated with respective metal salt solutions. The second weight loss, around 200 to 300° C., is due to the loss of $-CH_3O$ through oxidation by thermally accelerated oxidation.

Figure 2:
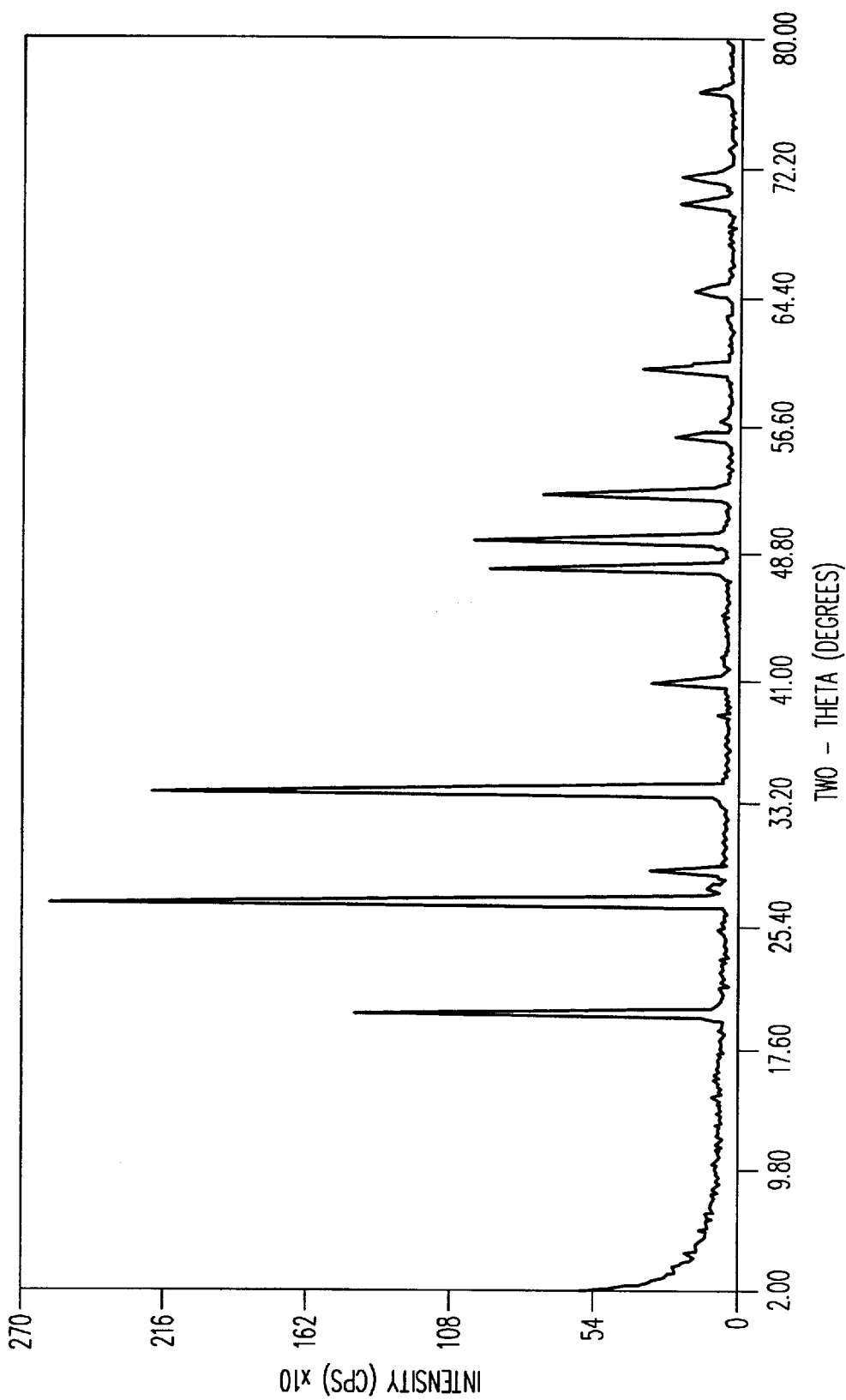
FIG. 2 shows X-ray diffraction patterns of Eu activated Y,Gd,Sr borate phosphor prepared from RE nitrates (example VI).

X-ray powder diffraction data for a sample fired at 950° C. is shown in FIG. 2. The samples fired at 800° C. show some of the lines corresponding to the yttrium, gadolinium borate phase. All the prominent lines corresponding to yttrium, gadolinium borate phases are observed in samples fired at and above 900° C. From the data, it is concluded that the samples are completely converted to borate, as no lines corresponding to any of these metal nitrates or oxides are observed. This conclusion is also supported by TGA data. The lines corresponding to metal borate phase are more prominent with increasing firing temperature.

Figure 3A:
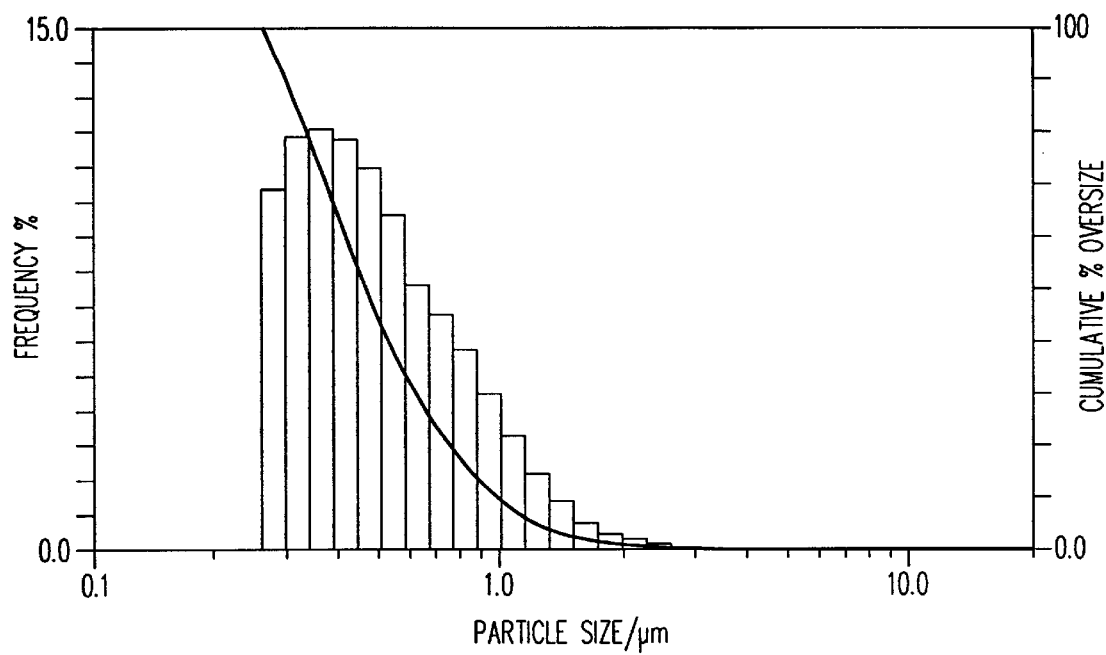
FIGS. 3a and 3b are plots of particle size distribution of Y,Gd borate phosphors prepared from a) RE hydroxides and b) RE nitrates.
Figure 3B:
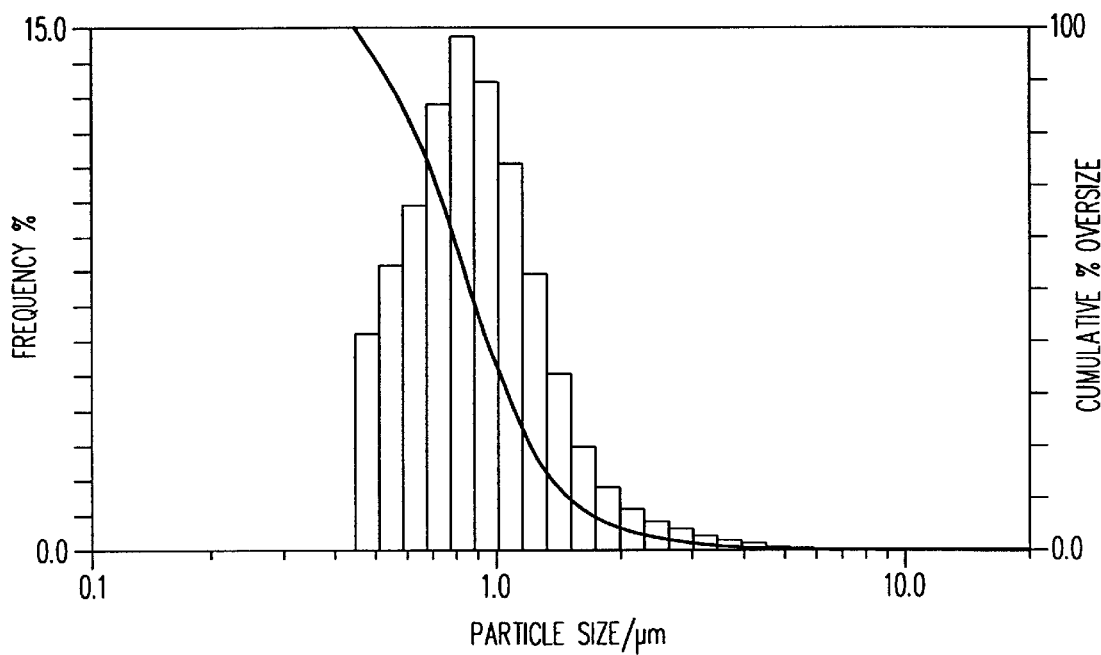

Since the luminescence of a phosphor depends on the shape, size, crystallinity, defects and grain boundaries, the morphology and PSD of all the samples prepared at various conditions were studied. From these studies, it was observed that phosphor particles were uniform and exhibited spherical shapes. The PSD of phosphors prepared at different temperatures are shown in FIG. 3. washing the powders with hot water (80 to 90° C.) may eliminate very small particles (<0.05 microns). Very small particles (<0.05 microns) may be collected by means of centrifuging. The emission characteristics of these phosphors are carried out on powders, as well as coated screens, at room temperature.

Figure 4A:
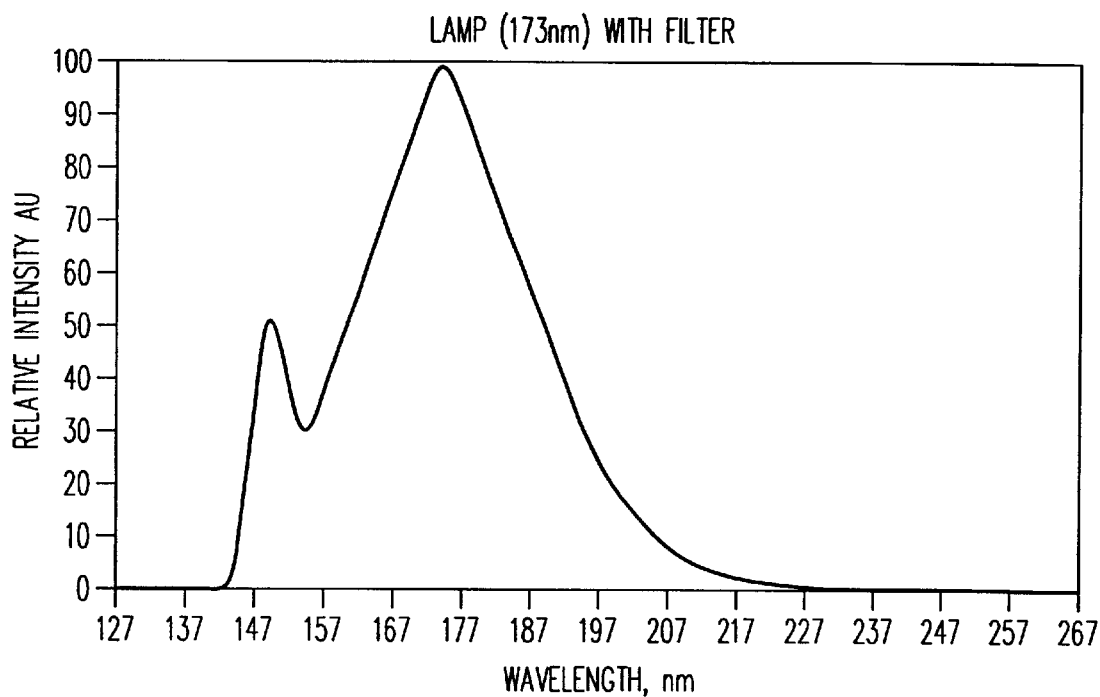
FIGS. 4a and 4b show spectral distribution of radiation energy from Xe lamps a) 147 nm and b) 173 nm wavelengths with $MgF_2$ windows and suitable band pass filters.
Figure 4B:
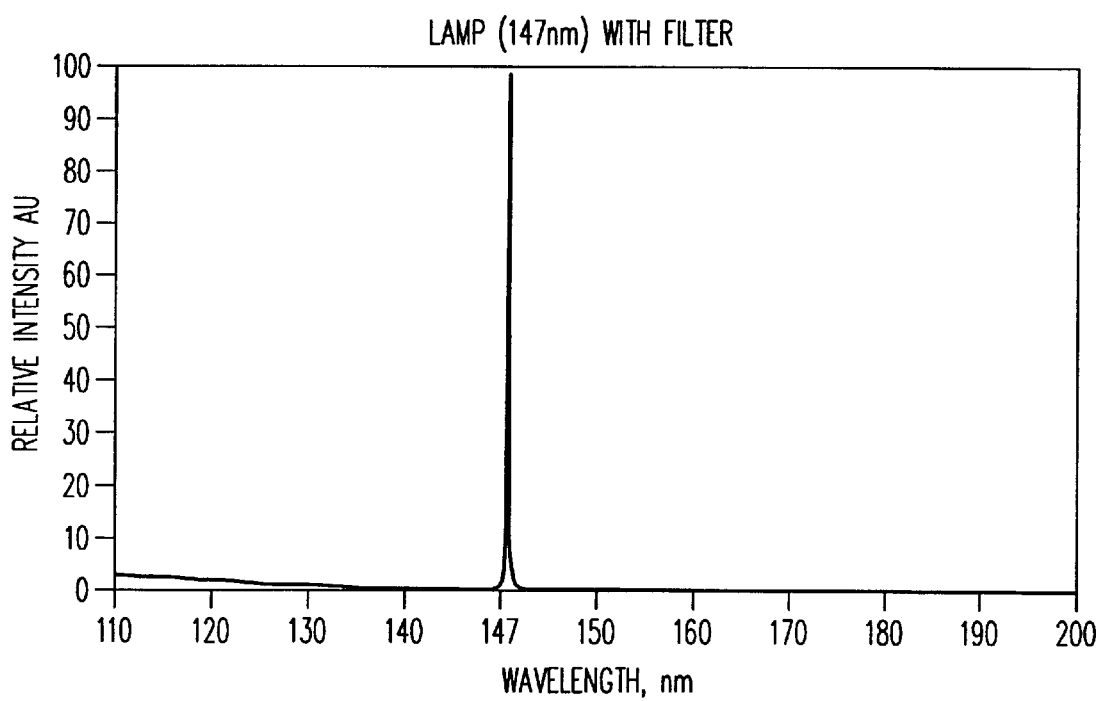
Figure 5A:
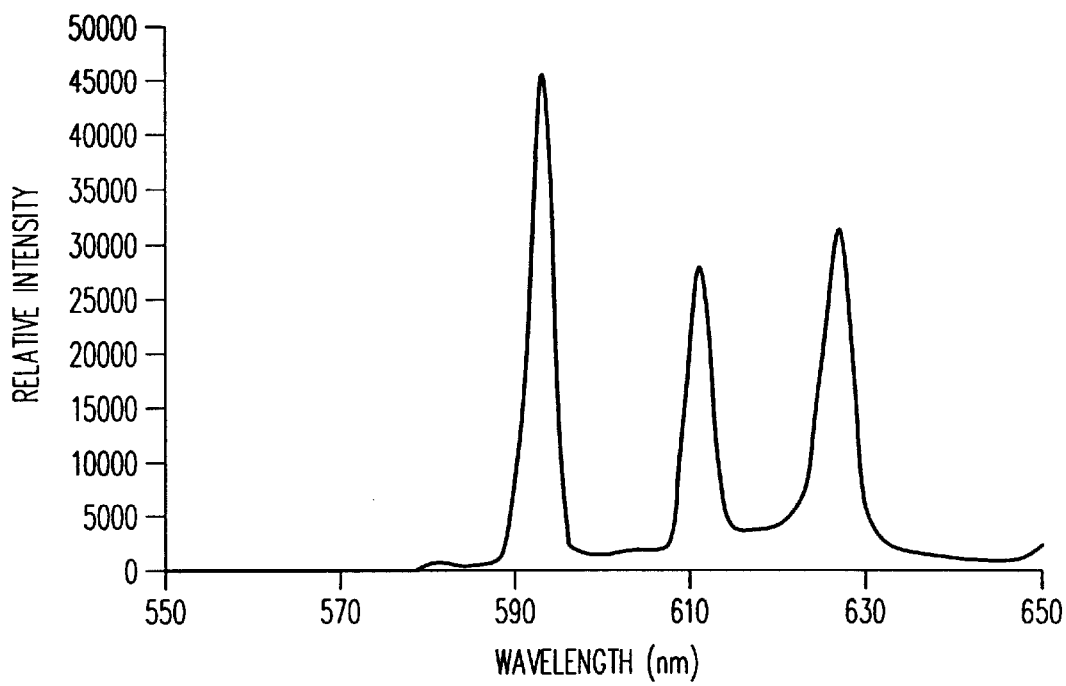
FIGS. 5a and 5b show emission spectra of Y,Gd borate phosphors at a) 147 nm and b) 173 nm excitations recorded at room temperature.
Figure 5B:
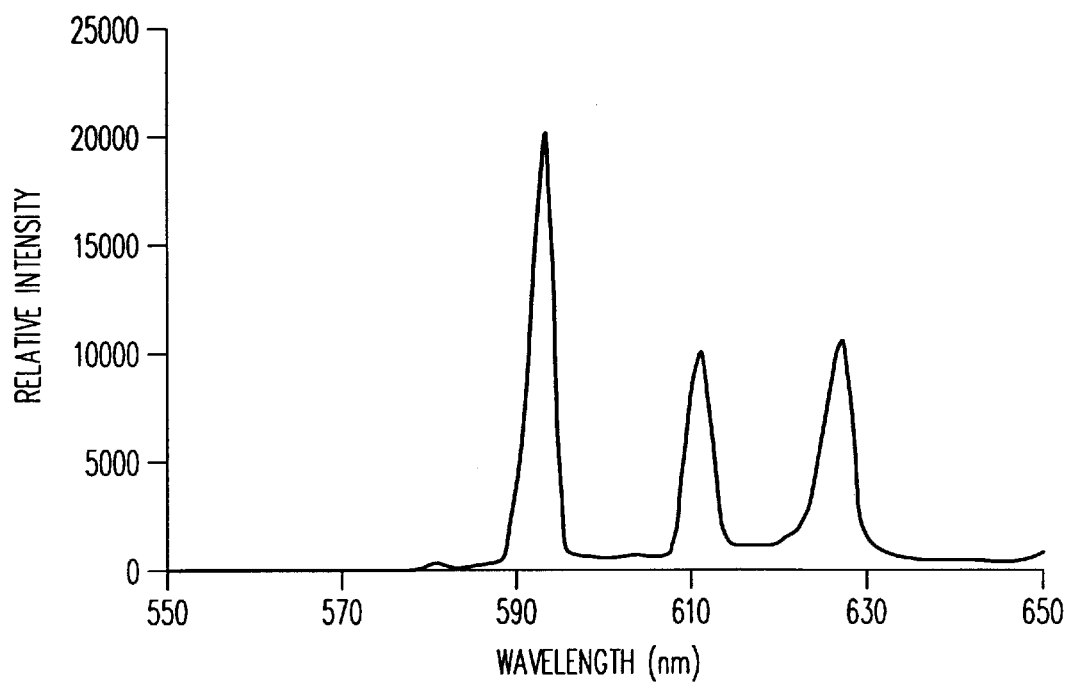

FIG. 4 represents the spectral distribution of radiation energy from two different custom made Xenon lamps corresponding 147 and 173 nm, with an $MgF_2$ window and suitable band filters. The emission spectra of Eu activated yttrium, gadolinium borate phosphors, prepared at various temperatures from metal nitrate, are shown in FIG. 5. In general, the luminescence (emission) lines at 593, 611 and 627 nm lines correspond to $^5D_0 \rightarrow {}^7F_1$ (orange red) and $^5D_0 \rightarrow {}^7F2$ (red) transitions. In general, the luminescence (emission) lines at 593, 611 and 627 nm lines correspond to $^5D_0 \rightarrow {}^7F_1$ (orange red) and $^5D_0 \rightarrow {}^7F_1$ (red) transitions.

The peak maximum and intensity of each red line (593 nm, 611 nm and 627 nm) are dependent on the Eu and Gd concentrations. For lamp applications, all three lines at 593 nm (orange), 611 nm (red) and 627 nm (red) are quite acceptable. But in the case of displays, specifically for television applications, it is preferable to have more of red. The present invention also addresses the intensity enhancement of the red emission lines at 611 and 627 nm.

A particularly suitable phosphor can contain from about 32 wt. % to about 48 wt. % of yttrium, from about 18 wt. % to about 9 wt. % of gadolinium, up to about 5 wt. % of an alkaline earth (Ba, Sr, Ca, Mg) and about 4 wt. % to about 8 wt. % of europium and about 6.6 wt. % to about 7 wt. % of boron. All weight percentages are based on the total weight of the phosphor.

Further details of this invention will be described with reference to the following examples.

EXAMPLE I (COMPARATIVE)

The preparation of improved $Eu^{3+}$ activated yttrium gadolinium borate phosphor employing the hydroxides of yttrium, gadolinium and europium and acid catalyzer by a sol-gel process is described in this example. The amounts of respective hydroxide solution (semi-gels) prepared from ion exchange column and borate solutions, in volume and percentage by weight per batch, are described in Table I.

TABLE I

| Chemical | Quantity (CC) | Element (Gm) | Mol. % |
| --- | --- | --- | --- |
| Yttrium Hydroxide (0.01M) | 1700 | 1.506 | 85 |
| Gadolinium Hydroxide (0.01M) | 200 | 0.314 | 10 |
| Europium Hydroxide (0.01M) | 100 | 0.148 | 5 |
| Trimethyl Borate (0.08M) | 200 | 0.173 | — |
| Boric Acid (0.65M) | 15 | — | — |

The above hydroxide solutions are mixed in a round bottom flask. Required quantities of trimethyl borate solution are added slowly to the hydroxide solution while stirring at 45° C.; boric acid is added, drop wise, when the solution attains the maximum required temperature (90–95° C.) and peptized at that temperature for about 9–12 hours. A water condenser column is maintained at 20° C. throughout the pepitization with the help of a circulating chiller. After cooling the flask to room temperature, the solution (semi-gel) is transferred to a crystallizing dish (3L capacity) and left in an open atmosphere. After 5 to 6 days, the solution has become a gel.

These transparent gels are left at 45 to 50° C. for 12 hours in a lab oven. The dried product is called a xerogel. The loose mass from the glass dish is crushed in a glass mortar and pestle. A fine powder is collected into a crucible and fired at 300° C. for 2 hours (rate of heating is 2° C./min.) and then 950° C. for 6 hours, using the same rate of heating, in a box furnace. The sample is left in the furnace until it cools to room temperature.

A hard mass is obtained after cooling. A small quantity of water pulps the hard mass into very fine phosphor particles. These fine phosphor particles are subjected to ultrasonic agitation or a water-jet treatment. Water-jet or ultra sonic treatment helps to break the clusters into very small powder particles. After washing with water, these powders are dried at 100° C. for 6 hours. Sub-micron sized particles (<0.1 micron) can be recovered from the wash water by centrifuging the solution.

The emission characteristics of these phosphors have been studied by exciting them with 147 and 173 nm excitation sources (Xe lamp). The results are given in Table IX. For comparison, average particle size is also mentioned.

EXAMPLE II (COMPARATIVE)

The preparation of improved $Eu^{3+}$ activated yttrium, gadolinium borate phosphor employing yttrium nitrate, gadolinium nitrate, europium nitrate and trimethyl borate in an acid catalyzer is described in this example. Starting materials used in the present example in grams and percentage by weight per batch, are listed in Table II.

TABLE II

| Chemical | Quantity (CC) | Element (Gm) | Mol. % |
| --- | --- | --- | --- |
| Yttrium Nitrate (0.02M) | 1500 | 2.658 | 85 |
| Gadolinium Nitrate (0.02M) | 176 | 0.554 | 10 |
| Etiropium Nitrate (0.02M) | 88 | 0.261 | 5 |
| Trimethyl Borate (0.08M) | 350 | 0.305 | — |
| Boric Acid (0.65M) | 27 | — | — |

The above nitrates solutions are mixed in a round bottom flask. Required quantities of methyl borate solution are added slowly to the nitrate solution while stirring at 45° C. The solution is peptized at 80° C. for about 12 hours. The remaining preparative procedure (drying of sol-gel to xerogel, calcination of xerogel, cooling, pulping, washing, drying and study of emission characteristics) is the same as mentioned in Example I.

EXAMPLE III (COMPARATIVE)

The preparation of improved $Eu^{3+}$ activated yttrium, gadolinium borate phosphor employing yttrium nitrate, gadolinium nitrate, europium nitrate, barium nitrate and trimethyl borate in an acid catalyzer is described in this example. Starting materials used in the present example, in grams and percentage by weight per batch, are listed in Table III.

TABLE III

| Chemical | Quantity (CC) | Element (Gm) | Mol. % |
| --- | --- | --- | --- |
| Yttrium Nitrate (0.02M) | 1412 | 2.500 | 80 |
| Gadolinium Nitrate (0.02M) | 176 | 0.554 | 10 |
| Europium Nitrate (0.02M) | 88 | 0.261 | 5 |
| Barium Nitrate (0.02M) | 88 | 0.241 | 5 |
| Trimethyl Borate (0.08M) | 350 | 0.305 | — |
| Boric Acid (0.65M) | 27 | — | — |

The above nitrate solutions are mixed in a round bottom flask. Required quantities of methyl borate solution are added slowly to the nitrate solution while stirring at 45° C. The solution is peptized at 80° C. for about 12 hours. The remaining preparative procedure (drying of sol-gel to xerogel, calcination of xerogel, cooling, pulping, washing, drying and study of emission characteristics) is the same as mentioned in Example I.

EXAMPLE IV (COMPARATIVE)

The preparation of improved $Eu^{3+}$ activated yttrium, gadolinium borate phosphor employing yttrium nitrate, gadolinium nitrate, europium nitrate, strontium nitrate and trimethyl borate in an acid catalyzer is described in this example. Starting materials used in the present example, in grams and percentage by weight per batch, are listed in Table IV.

TABLE IV

| Chemical | Quantity (CC) | Element (Gm) | Mol. % |
| --- | --- | --- | --- |
| Yttrium Nitrate (0.02M) | 1412 | 2.500 | 80 |
| Gadolinium Nitrate (0.02M) | 176 | 0.554 | 10 |
| Europium Nitrate (0.02M) | 88 | 0.261 | 5 |
| Strontium Nitrate (0.02M) | 88 | 0.257 | 5 |
| Trimethyl Borate (0.08M) | 350 | 0.305 | — |
| Boric Acid (0.65M) | 27 | — | — |

The above nitrate solutions are mixed in a round bottom flask. Required quantities of methyl borate solution are added slowly to the nitrate solution while stirring at 45° C. The solution is peptized at 80° C. for about 12 hours. The remaining preparative procedure (drying of sol-gel to xerogel, calcination of xerogel, cooling, pulping, washing, drying and study of emission characteristics and drying) is the same as mentioned in Example I.

EXAMPLE V (COMPARATIVE)

The preparation of improved $Eu^{3+}$ activated yttrium, gadolinium borate phosphor employing yttrium nitrate, gadolinium nitrate, europium nitrate, strontium nitrate and trimethyl borate in an acid catalyzer is described in this example. Starting materials used in the present example, in grams and percentage by weight per batch, are listed in Table V.

TABLE V

| Chemical | Quantity (CC) | Element (Gm) | Mol. % |
| --- | --- | --- | --- |
| Yttrium Nitrate (0.02M) | 1412 | 2.500 | 80 |
| Gadolinium Nitrate (0.02M) | 176 | 0.554 | 10 |
| Europium Nitrate (0.02M) | 88 | 0.261 | 5 |
| Strontium Nitrate (0.02M) | 88 | 0.257 | 5 |
| Trimethyl Borate (0.08M) | 350 | 0.305 | — |
| Boric Acid (0.65M) | 27 | — | — |

The above nitrate solutions are mixed in a round tbottom flask. Required quantities of methyl borate solution are added slowly to the nitrate solution while stirring at 45° C. The solution is peptized at 80° C. for about 12 hours. The peptized solution is transferred to a heavy-duty filtration flask. The flask nozzle is connected to a vacuum pump through a low temperature vacuum trap. After complete extraction of solvent, high porous sponge like mass (aerogel) has been collected at the bottom of the flask. The remaining preparative procedure (calcination of aerogel, cooling, pulping, washing, drying and study of emission characteristics) is the same as mentioned in Example I.

EXAMPLE VI

The preparation of improved $Eu^{3+}$ activated rare earth, alkaline earth, borate phosphor employing a mixture of yttrium nitrate, gadolinium nitrate, europium nitrate, strontium nitrate and xerogel complex obtained from examples I to IV is described in this example. Materials used in the present example are listed in Table VI.

TABLE VI

| Chemical | Quantity (grams) |
|---|---|
| Dry Xerogel Powder (from Example IV) | 40.0 |
| Yttrium Nitrate (99.999%) | 90.6 |
| Gadolinium Nitrate (99.999%) | 17.3 |
| Europium Nitrate (99.99%) | 11.4 |
| Strontium nitrate (99.99%) | 9.1 |

The above nitrates and xerogel complex are mixed thoroughly in a mortar and pestle. A fine powder is collected into a crucible and fired at 350° C. for 2 hours (rate of heating is 2° C./min.) and then 950° C. for 2 hours, using the same rate of heating, in a box furnace. The sample is left in the furnace until it cools to room temperature. A hard mass is obtained after cooling. A small quantity of water pulps the hard mass into very fine particles. These fine phosphor powder particles are subjected to ultrasonic agitation or a water-jet treatment that helps to break the clusters in to very small powder particles. After washing with water, these powder particles are dried at 100° C. for 6 hours. Sub-micron sized particles (<0.1 micron) can be recovered from the wash water by centrifuging the solution.

The emission characteristics of these phosphors, studied separately by exciting with 147 and 173 nm excitation sources (Xe lamp) are given in Table IX. For comparison, average particle size is also mentioned in the same table.

EXAMPLE VII

The preparation of improved $Eu^{3+}$ activated RE,AE borate phosphor employing a mixture of yttrium nitrate, gadolinium nitrate, europium nitrate, strontium nitrate and aerogel complex obtained from Example V is described in this example. Materials used in the present example are listed in Table VII.

TABLE VII

| Chemical | Quantity (grams) |
|---|---|
| Dry Aerogel Powder (from Example V) | 40.0 |
| Yttrium Nitrate (99.999%) | 90.6 |
| Gadolinium Nitrate (99.999%) | 17.3 |
| Europium Nitrate (99.99%) | 11.4 |
| Strontium nitrate (99.99%) | 9.1 |

The above nitrates and aerogel complex are mixed thoroughly in a mortar and pestle. The remaining preparative procedure (calcination of aerogel complex and nitrates, cooling, pulping, washing, drying and study of emission characteristics) is the same as mentioned in Example VI.

EXAMPLE VIII (COMPARATIVE)

The preparation of improved $Eu^{3+}$ activated rare earth, alkaline earth borate phosphor employing a mixture of yttrium nitrate, gadolinium nitrate, europium nitrate, strontium nitrate and boric acid in powder form. Materials used in the present example are listed in Table VIII.

TABLE VIII

| Chemical | Quantity (grams) | Mol. % |
|---|---|---|
| Yttrium Nitrate (99.999%) | 44.0 | 80 |
| Gadolinium Nitrate (99.999%) | 8.6 | 10 |
| Europium Nitrate (99.99%) | 4.5 | 5 |
| Strontium nitrate (99.99%) | 2.1 | 5 |
| Boric acid | 17.6 | — |

The above nitrates powders are mixed thoroughly in a mortar and pestle. The mixed powder is transferred into a high grade alumina crucible and fired at 300° C. for 2 hours with a 2°/minutes rate of heating and then 1000° C. for 12 hours (SSR conditions), using the same rate of heating, in a box furnace. The sample is left in the furnace until it cools to room temperature. The remaining preparative procedure (pulping, washing, drying and study of emission characteristics) is the same as mentioned in Example VI.

TABLE IX

| | Relative Intensity at | | | | | | |
|---|---|---|---|---|---|---|---|
| | Excitation (147 nm) | | | Excitation (173 nm) | | | Range of Particle |
| Phosphor | 627 nm | 611 nm | 593 nm | 627 nm | 611 nm | 593 nm | Size in microns |
| Phosphor (Ex. 1) | 70.10 | 62.31 | 100.0 | 52.78 | 49.60 | 100.0 | 0.1–1.0 |
| Phosphor (Ex. 2) | 65.62 | 57.11 | 95.00 | 50.66 | 47.61 | 96.10 | 0.1–2.0 |
| Phosphor (Ex. 3) | 61.03 | 53.68 | 89.02 | 47.62 | 44.28 | 86.40 | 0.1–2.0 |
| Phosphor (Ex. 4) | 64.69 | 56.90 | 94.36 | 50.47 | 47.29 | 91.16 | 0.2–2.5 |
| Phosphor (Ex. 5) | 66.56 | 57.60 | 97.61 | 50.86 | 47.87 | 97.43 | 0.1–2.0 |
| Phosphor (Ex. 6) | 74.89 | 66.60 | 106.6 | 57.46 | 53.87 | 107.40 | 0.1–3.5 |
| Phosphor (Ex. 7) | 74.65 | 66.01 | 105.9 | 57.02 | 52.74 | 105.27 | 0.1–3.5 |
| Phosphor (Ex. 8) | 61.21 | 53.29 | 88.91 | 47.03 | 44.01 | 85.54 | 0.2–5.5 |

As the data of Table IX demonstrates, the phosphors of Examples I through VIII, formed by different processes of the present invention, provide smaller size particles, while generally also providing a higher level of intensity.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method of forming a europium activated yttrium, gadolinium borate phosphor having the empirical formula:

$$(Y_{1-x-y-z}Eu_xGd_yM_z) BO_3$$

wherein: $0.01 \leqq x \leqq 0.1$, $0 \leqq y \leqq 0.5$, M=Ba, Sr, Ca, Mg and $z \leqq 0.1$; said method comprising the steps of:
   a) reacting a dilute solution comprising a source of yttrium, a source of gadolinium, a source of an alkaline earth element (i.e., barium or strontium or calcium or magnesium), a source of europium and an organic precursor providing a source of boron, in an acid medium to form a dilute gel;
   b) converting said dilute gel into a xerogel or an aerogel;
   c) adding a quantity of nitrates of said rare earth elements and said alkaline earth element reacted in step (a); and
   d) thermally decomposing the xerogel or aerogel and quantity of nitrates at a temperature below a solid state reaction temperature to obtain said phosphor.

2. The method of claim 1, wherein said quantities of each nitrate and its respective rare earth element and alkaline earth element are adjusted so that the element and its nitrate exhibit a mole percent in accord with the empirical formula.

3. The method of claim 1 wherein said organic precursor providing a source of boron is trimethyl borate.

4. The method of claim 1, wherein said source of yttrium, gadolinium, europium and barium or strontium or calcium or magnesium is selected from the groups consisting of respective hydroxides thereof, and said organic precursor providing a source of boron is trimethyl borate.

5. The method of claim 1, wherein step d) decomposes said xerogel or aerogel and quantity of nitrates in an open atmosphere, at about 950° C. for about two hours.

6. The method of claim 5, wherein step b) causes said gel to be dried to form a xerogel or an aerogel and said xerogel or aerogel is crushed to form a powder prior to step d).

7. The method of claim 1, wherein said method is controlled to create substantially spherical phosphor particles having a particle size in the range of about 0.1 to about 3.5 microns.

8. The method of claim 1, wherein said phosphor comprises from about 32 wt. % to about 48 wt. % of yttrium, from about 18 wt. % to about 9 wt. % of gadolinium, up to about 5 wt. % of an alkaline earth element, from about 4 wt. % to about 8 wt. % of europium and about 6.6 wt. % to about 7 wt. % of boron.

9. A europium activated yttrium, gadolinium, alkaline earth borate phosphor having the empirical formula:

$$(Y_{1-x-y-z}Eu_xGd_yM_z) BO_3$$

wherein: $0.01 \leqq x \leqq 0.1$, $0 \leqq y \leqq 0.5$, M=Ba, Sr, Ca, Mg and $z \leqq 0.1$;
said phosphor produced by the steps of:
   a) reacting a dilute solution comprising a source of yttrium, a source of gadolinium, a source of an alkaline earth element(i.e., barium or strontium or calcium or magnesium), a source of europium and an organic precursor providing a source of boron, in an acid medium to form a dilute gel;
   b) converting said dilute gel into a xerogel or an aerogel;
   c) adding a quantity of nitrates of said rare earth elements and asaid alkaline earth element reacted in step (a); and
   d) thermally decomposing the xerogel or aerogel and quantity of nitrates at a temperature below a solid state reaction temperature to obtain said phosphor.

10. The phosphor of claim 9, wherein said quantities of each nitrate and its respective rare earth element or alkaline earth element are adjusted so that the element and its nitrate exhibit a mole percent in accord with the empirical formula.

11. The phosphor of claim 9 wherein said organic precursor providing a source of boron is trimethyl borate.

12. The phosphor of claim 9, wherein said source of yttrium, gadolinium, europium and barium or strontium or calcium or magnesium is selected from the groups consisting of respective hydroxides thereof, and said organic precursor providing a source of boron is trimethyl borate.

13. The phosphor of claim 9, wherein step d) decomposes said xerogel or aerogel and quantity of nitrates in an open atmosphere, at about 950° C. for about two hours.

14. The phosphor of claim 13, wherein step b) causes said gel to be dried to form a xerogel or an aerogel and said xerogel or aerogel is crushed to form a powder prior to step d).

15. The method of claim 9, wherein said phosphor exhibits substantially spherical phosphor particles having a particle size in the range of about 0.1 to about 3.5 microns.

16. The phosphor of claim 9, wherein said phosphor comprises from about 32 wt. % to about 48 wt. % of yttrium, from about 18 wt. % to about 9 wt. % of gadolinium, up to about 5 wt. % of an alkaline earth element, from about 4 wt. % to about 8 wt. % of europium and about 6.6 wt. % to about 7 wt. % of boron.

* * * * *